United States Patent
Johansson (10) Patent No.: US 6,874,400 B2
(45) Date of Patent: Apr. 5, 2005

(54) CUTTING TOOL UNIT AND ASSEMBLY, AND MACHINE AND ASSOCIATED CUTTING METHOD

(75) Inventor: Mats Johansson, Svanesund (SE)

(73) Assignee: Aktiebolaget Electrolux, Stockholm (SE)

( * ) Notice: Subject to any disclaimer, the term of this patent is extended or adjusted under 35 U.S.C. 154(b) by 0 days.

(21) Appl. No.: 10/128,019

(22) Filed: Apr. 22, 2002

(65) Prior Publication Data

US 2002/0174913 A1 Nov. 28, 2002

(51) Int. Cl.[7] .............................................. B23D 45/10
(52) U.S. Cl. .................... 83/877; 83/425.3; 125/13.01; 125/20; 30/503.5; 30/388
(58) Field of Search ................. 30/503.5, 388; 144/237, 238, 222; 125/13.01, 13.03, 14, 15, 20, 5; 83/425.3, 864, 876, 877, 878, 666, 673, 676; 299/39.3

(56) References Cited

U.S. PATENT DOCUMENTS

| | | | | |
|---|---|---|---|---|
| 247,109 A | * | 9/1881 | Reese | ........................ 299/39.3 |
| 387,604 A | * | 8/1888 | St. Louis | ..................... 83/424 |
| 933,932 A | * | 9/1909 | Thomas | |
| 1,060,793 A | * | 5/1913 | Segraves | ............... 144/250.18 |
| 1,808,850 A | * | 6/1931 | Homewood | ................. 299/39.3 |
| 2,502,043 A | * | 3/1950 | Howard | |
| 3,513,888 A | * | 5/1970 | Townsend et al. | ............. 30/390 |
| 3,583,106 A | | 6/1971 | Dobbertin et al. | |
| 3,893,240 A | | 7/1975 | Morner et al. | |
| 3,986,259 A | * | 10/1976 | McReynolds | |
| 4,542,940 A | * | 9/1985 | Marten | |
| 4,646,607 A | | 3/1987 | Johansson | |
| 4,717,205 A | | 1/1988 | Sasage | |
| 4,959,907 A | | 10/1990 | Buratty | |
| 5,020,280 A | * | 6/1991 | O'Reilly | ...................... 451/342 |
| 5,027,517 A | | 7/1991 | Reuter | |
| 5,103,705 A | | 4/1992 | Bechem | |
| 5,887,579 A | | 3/1999 | Eriksson et al. | |
| 5,996,462 A | * | 12/1999 | Gittel | |

FOREIGN PATENT DOCUMENTS

| | | | |
|---|---|---|---|
| SU | 0726251 | * | 4/1980 |
| WO | WO 01/23157 A3 | | 4/2001 |
| WO | WO 01/23157 A2 | | 4/2001 |

* cited by examiner

*Primary Examiner*—Kenneth E Peterson
(74) *Attorney, Agent, or Firm*—Pearne & Gordon LLP (57) ABSTRACT

A rotatable cutting tool unit of a tool assembly for a cutting machine that is used in conjunction with an associated method of cutting provides several novel aspects. The tool arrangement, which includes two tool units, includes first and second disk-shaped tools rotatable about an axis. The tools define maximum tool arrangement boundaries along the axis. A driving arrangement, at an axial location between the first and second tools, supports the first and second tools for rotation and transfers driving force. A radially outer periphery of the driving arrangement is at a radius less than a radius of a peripheral cutting edge portion of the first tool and less than a radius of a peripheral cutting edge portion of the second tool.

26 Claims, 10 Drawing Sheets

CUTTING TOOL UNIT AND ASSEMBLY, AND MACHINE AND ASSOCIATED CUTTING METHOD

TECHNICAL FIELD

The present invention relates to a rotatable cutting tool unit, and a cutting machine that includes a machine body and at least the tool unit, and further to an associated method of cutting. Specifically, the present invention relates to a tool unit, machine, and associated method that provided for improved ability to cut an object.

BACKGROUND OF THE INVENTION

In the building industry, cutting openings for doors, windows, ventilation ducts, stairways, foundations, etc. through objects such as walls, roofs, and floors are frequent operations. Objects of this type often are thick and they typically consist of reinforced concrete, stone, brick, masonry, metal, wallboard, panelling, and similar building materials, or various composite building materials. Various techniques are employed for performing the cutting operations. Known mechanical working machines are used, such as chain saw machines or ring cutter machines, that have various advantages as well as disadvantages.

Chain saw machines employed for cutting hard materials, such as stone and concrete are diamond-tipped. Typically these machines have a guide bar and a saw chain of a considerable length, which makes it possible to cut/penetrate thick objects. Among the drawbacks of such machines is that the wear of the links of the saw chain is severe when cutting materials of the mentioned type. Such wear shortens the use life of the saw chain. Wear shortening of use life is a serious drawback, especially because diamond tipped saw chains are very expensive. Another drawback is that very powerful engines are required for this machines type. Further, also the guide bar and the drive wheels are subjected to wear because of the slurry that is generated during the work, especially because the chain slides in a groove in the guide bar and because only water is used as a lubricant. The guide bar and the drive wheel therefore also frequently need to be replaced.

As far as cutting machines that have rotating cutting or sawing disks of a conventional type are concerned, the maximal cutting depth is limited to less than half the diameter of the used cutting or sawing blade. This limited cutting depth is due to the fact that the rotation axis of the disk (blade), i.e. its spindle, always is longer than widths of the kerf (cut) that the blade makes in the object being cut. When larger objects are to be cut (e.g., when making openings in thick walls, roofs or floors), machines having very large, rotating blades need to be used. However, larger blades and the associated powerful driving motors required to rotate larger blades result in an increase in weight and a decrease in portability/manoeuvrability. Conventional machines that are used for cutting and/or sawing very thick objects therefore are not hand-held machines. Vice versa, hand-held cutting machines of conventional type can be used only for working comparatively thin objects. A machine belonging to this category is shown, e.g., in U.S. Pat. No. 3,583,106.

Cutting machines of the ring saw type (see for example, U.S. Pat. No. 4,646,607), has an off-center drive of the cutter blade. As such, there is a lack of a hindering central spindle, which in turn allows cutting to greater depths than half the diameter of the saw blade. However, the diameter of hand-held machines of the ring saw type is limited because of the weight of the machine, which will be considerably large if the blade is large, especially as big blades also need to be comparatively thick in order to be of sufficient strength. As is the case for other conventional cutting machines, the necessary drive power is increased in relation to the diameter of the blade, which further increases the total weight of the machine. When the blade is diamond-tipped, the costs for the diamond tipping is also increased very much if the diameter as well as the thickness of the blade are increased. Therefore, there are technical as well as economical limitations of the blade size, which in turn restrict the feasibility of this type of machines as far as the thickness of the object to be worked (i.e., cut) is concerned.

A so-called flat sawing machine is a special type of cutting machine. An example of this type of machine is shown in U.S. Pat. No. 5,887,579. The saw blade of a machine of this type has one side that is flat, i.e. it is void of projecting parts. On the opposite side there is a spindle, which is driven by a driving assembly at the side of the saw blade. Machines of this type are used in order to make sawing, e.g., into a wall at a corner where two walls intersect, possible. In such a situation, the flat side of the saw blade is applied close to one of the walls to permit the saw blade to cut into the other wall in the corner. It is to be noted that such a machine, however, can only be used for cutting walls, which are thinner than slightly less than half the diameter of the saw/cutting blade.

Further it is known through WO 01/23157 to dig into an object, more particularly into a rock formation desired to be mined in connection with a quarrying process, wherein two slots are cut into the rock at a distance from one another. In a subsequent operation, the rock material between the slots is crushed. The tools in this case are rotated about a joint axle having axle spindles, which project laterally from the outer sides of the outer tools of the tool assembly. The axle spindles set a limit for the penetration depth. Alternatively, a very broad trench may be achieved through several working operations, which allows working deeper into the rock formation, so that finally a ditch-like trench having stair-stepped or sloping walls is achieved.

In light of the above background there is a long felt need of machines of improved performance. Specifically there is a need to cut deeper than what has been possible to do according to the prior art, employing disk shaped, rotatable tools having a certain diameter. It is particularly desirable to make it easy to handle the machine, not only during the cutting or corresponding operation but also, e.g. in connection with exchange of replacement parts, in the first place of the tools. It is also desirable to reduce the number of machine components that must handled in connection with a change of tools. For these and other reasons, it is desirable to be able to use tool units that include a tool and a driving member as will be described in the following disclosure and to adapt the cutting machine to such tool units.

SUMMARY OF THE INVENTION

In accordance with one aspect, the present invention provides a tool arrangement for a cutting machine. The tool arrangement includes a first disk-shaped tool rotatable about an axis and having an axially outer side defining a first maximum tool arrangement boundary along the axis. The first tool has a radially outer peripheral cutting edge portion. The tool arrangement includes a second disk-shaped tool rotatable about the axis and having an axially outer side defining a second maximum tool arrangement boundary along the axis. The second tool has a radially outer peripheral cutting edge portion. The tool arrangement has a driving arrangement, at an axial location between the first and second tools, for supporting the first and second tools for rotation and transferring driving force from a transmission member to rotate the first and second tools. A radially outer periphery of the driving arrangement is at a radius less than a radius of the peripheral cutting edge portion of the first tool and less than a radius of the peripheral cutting edge portion of the second tool to permit the first and second tools to engage a material to be cut without engagement of the driving arrangement with the material to be cut.

In accordance with another aspect, the present invention provides a cutting machine for cutting through a material. The machine includes a machine body containing a power source, and a tool carrier extending from the machine body and the contained power source. The machine includes a power transmission arrangement extending from the machine body and the contained power source along the tool carrier, and a tool arrangement supported on the tool carrier. The tool arrangement includes a first disk-shaped tool rotatable about an axis and having an axially outer side defining a first maximum tool arrangement boundary along the axis. The first tool has a radially outer peripheral cutting edge portion. The tool arrangement includes a second disk-shaped tool rotatable about the axis and having an axially outer side defining a second maximum tool arrangement boundary along the axis. The second tool has a radially outer peripheral cutting edge portion. The tool arrangement has a driving arrangement, at an axial location between the first and second tools, for supporting the first and second tools for rotation and transferring driving force from a transmission member to rotate the first and second tools. A radially outer periphery of the driving arrangement is at a radius less than a radius of the peripheral cutting edge portion of the first tool and less than a radius of the peripheral cutting edge portion of the second tool to permit the first and second tools to engage a material to be cut without engagement of the driving arrangement with the material to be cut.

In accordance with yet another aspect, the present invention provides a material cutting and removal method. The method includes simultaneously cutting, with a rotary tool arrangement having a rotary axis, two substantially parallel kerfs into the material such that material is left uncut between the two kerfs. At least part of the uncut material between the two kerfs is removed. The method also includes the subsequential step of simultaneously cutting, with the rotary tool arrangement, to extend the two kerfs to a cut depth greater than a maximum radius of the rotary tool.

In accordance with still another aspect, the present invention provides a tool unit for a cutting machine, the tool unit is for cooperation with another tool unit within an assembly to accomplish cutting by the cutting machine. The tool unit includes a disk-shaped tool rotatable about an axis and having an axially outer side defining a first maximum tool unit boundary along the axis. The tool has a radially outer peripheral cutting edge portion. The tool unit includes a portion of a driving arrangement located adjacent to the tool. The portion of the driving arrangement supporting the tool for rotation and the driving arrangement transferring driving force from a transmission member to rotate the tool. A radially outer periphery of the portion of the driving arrangement is at a radius less than a radius of the peripheral cutting edge portion of the tool to permit the tool to engage a material to be cut without engagement of the portion of the driving arrangement with the material to be cut. The portion of the driving arrangement includes a driving wheel half, the driving wheel half is configured to mate with a driving wheel half of the other tool unit and, as mated, provide a driving wheel within the tool assembly.

BRIEF DESCRIPTION OF DRAWINGS

The foregoing and other features and advantages of the present invention will becomes apparent to one skilled in the art to which the present invention relates upon consideration of the following description of the invention with reference to the accompanying drawings, wherein:

FIG. 1 is a schematic side view of a machine according to a first machine embodiment of the present the invention, with certain parts in one position;

DESCRIPTION OF EXAMPLE EMBODIMENTS

FIG. 1 schematically shows a first embodiment of a cutting machine 1 in accordance with the present invention for working on (i.e., cutting into the material) an object. It is to be appreciated that the term cutting is to be broadly interpreted to mean the removal of material from the object. The term cutting is to be interpreted to include sawing. Also, the term object is to be interpreted to mean any object, such as a work piece or blank. Further, the term object includes building constructions/materials having a large extension dimensions, for example a concrete construction, and more limited working pieces, such as a single stone block.

The machine 1 includes a rotatable, disk-shaped tool 3 that rotates to perform cutting working on the object. In the example shown in the FIG. 1, one tool is provided and is discussed further in detail hereinafter. The single tool 3 provides one aspect of the present invention. However, it is to be appreciated that a second tool may also be provided. Such provision of two tools is another aspect of the present invention and is discussed subsequently herein below.

Turning attention to the embodiment of FIG. 1, another portion (i.e., portion 2) of the machine 1 includes a power source (e.g., a motor such as an electric motor) that provides driving force to other main parts via a suitable power transmission in order to accomplish the cutting. In the example, the power source is located distal from the tool 3 and is not in direct connection to the tool. In the illustrated example, the power source includes a motor in a machine body 2, which is located at a radial distance from a rotational axis of the tool 3. The machine body 2 thus may consist of a machine body of a known, conventional hand-held or mobile cutting or sawing machine. As such, the machine body 2 may include a combustion engine or motor, an electric motor, a hydraulic motor, or a pneumatic motor.

A transmission and carrying unit 4 is located between the machine body 2 and the tool 3. The unit 4 transmits power from the motor in the machine body 2 to the tool 3. Also, the unit supports (e.g., holds at a location) the tool 3 at a certain, defined distance from the machine body 2. It is to be noted that the defined distance typically exceeds a maximum radius of the tool 3, and may even greatly exceed the radius of the tool.

Figure 2:
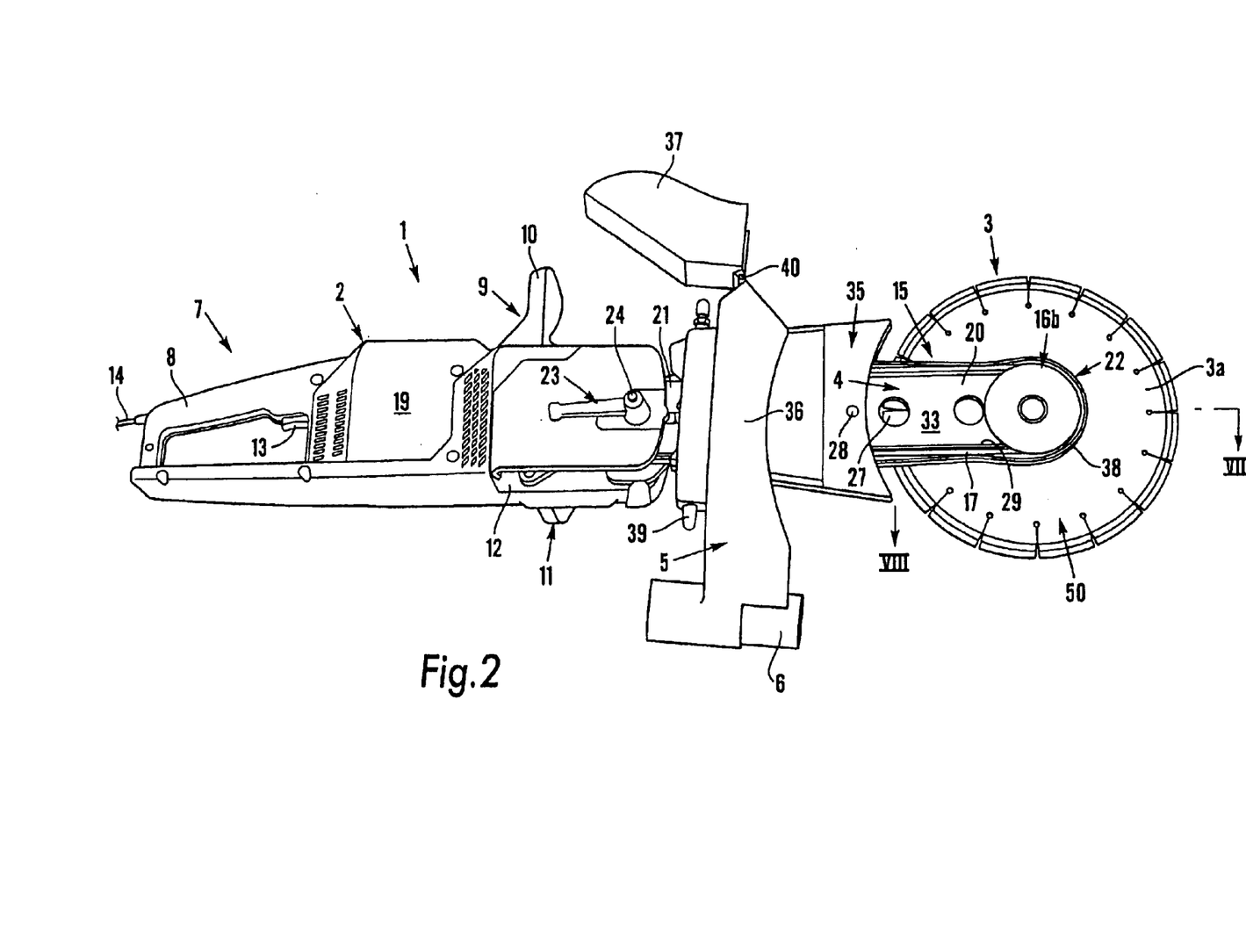
FIG. 2 is a view similar to FIG. 1, but with the certain parts in another position.
Figure 3:
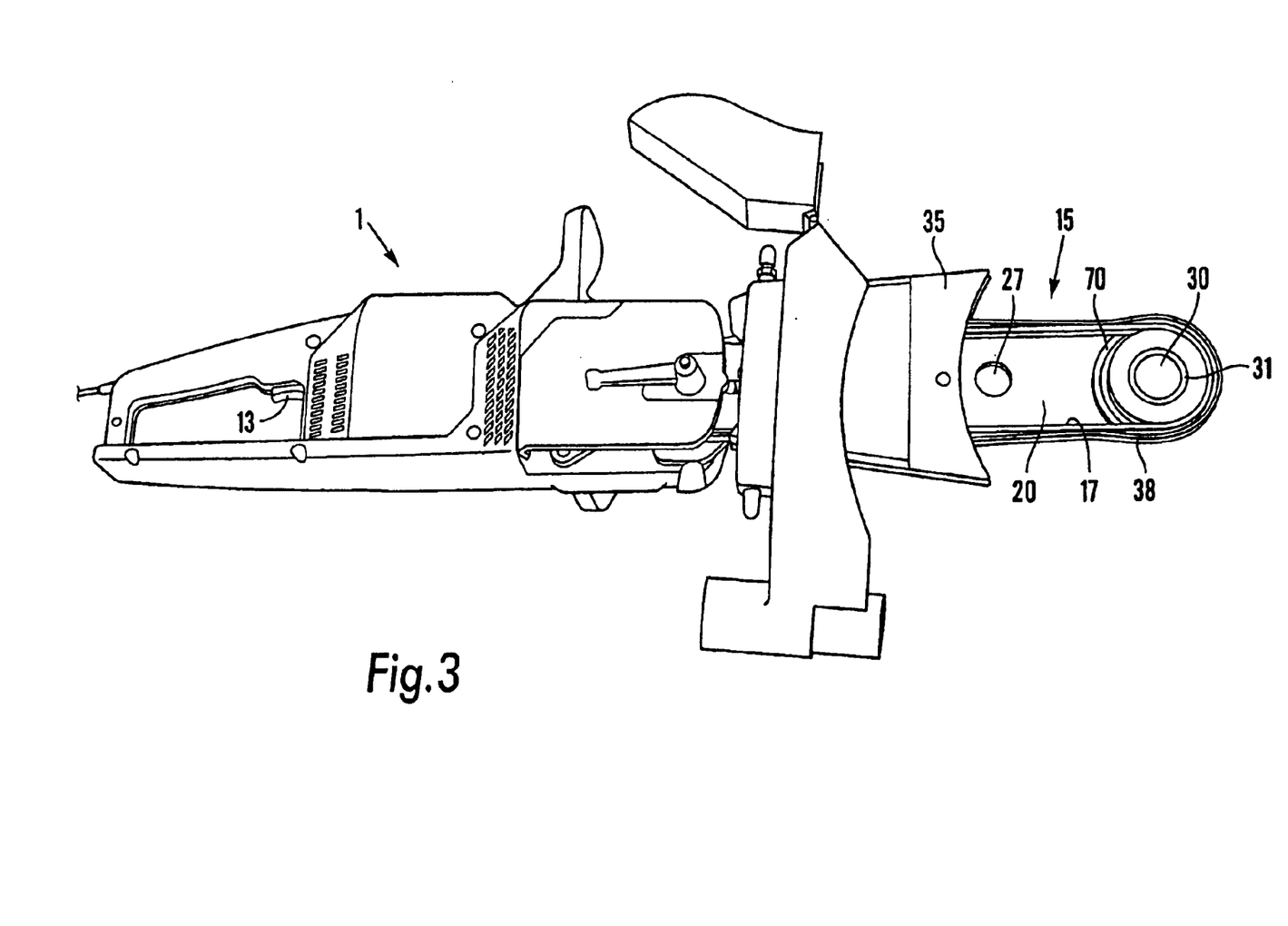
FIG. 3 is a view similar to FIG. 2, but with some parts removed.

It is to be appreciated that the machine 1 may include one or more guards (e.g., 5, see FIGS. 1–3). It is to be appreciated that the presence of such one or more guards in the shown examples is not to be construed as a limitation on the present invention. As such, one example of such a guard structure is an adjustable tool guard 5, which is located in close proximity to a portion (e.g., a rear portion) of the tool 3. Also, it to be appreciated that the machine 1 may include other structures that are not to be construed as limitations on the present invention. For example, as shown in the Figures, a retainer 6 for a possible vacuum dust cleaner device in provided. The dust cleaner device or devices, however, are not shown in any detail. As other examples of other structures that may be included in the machine include devices for spraying water or the like, etc.

Turning again to the machine body 2, the shown example machine body includes a rear gripping appliance 7 with a rear control handle 8 and a front gripping appliance 9 with a front control handle 10 for manual grasping and controlling the machine 1 when pressing the tool 3 against the object to be cut. As another example of some additionally provided structure, a control handle guard 11 is located on a tool side (i.e., front side) of the front control handle 10.

The machine body 2 also includes a chassis 12. The motor, a motor control 13 (e.g., with an optional variable-speed gear drive and coupling), and various conduits and cables (e.g., for cooling water, hydraulic oil, electric power supply, vacuum dust cleaning, etc.) are mounted on or to the chassis 12 (not shown in detail). The motor control 13, may be in the form of a trigger-type switch, and is shown to be located at the rear control handle 8. It is to be appreciated that in concert with the motor, there is provided a bearing housing with a suitable bearing, from which a rotatable axle shaft projects, on which shaft there is provided a first, rear driving wheel (not shown), which suitably consists of a gear, a belt pulley, or any other suitable drive for moving a power transmission device 17 along, around or inside the transmission and carrying unit 4 for driving a second, front driving wheel 16b, which is connected to rotate with the tool 3.

In one example, the power transmission device 17 consists of a flexible, endless member in the form of a chain, driving belt or V-belt, driving band, or any other similar, suitable device, the cross section and construction of which are adapted to the rear and front driving wheels/driving members. In the discussed example, the power transmission device 17 is a V-belt. The invention, however, is not restricted to only flexible, endless transmission devices, such as a V-belt 17. It is contemplated that other suitable power transmission devices exist, or can be suggested, and such other devices may be employed within the scope of the present invention. One possible example of such other devices is a series of cooperating gears along the transmission and carrying unit 4.

Many of the machine elements mentioned in the preceding paragraphs may consist of well-known machine components. Therefore, such machine components are not described in detail and some are not shown, but it is to be understood that the components are present and may be located behind a number of guards (e.g., 19) enclosing such structural elements. Here also, these guards 19 are optional and are typically removably attached in any suitable manner.

Turning again to the transmission and carrying unit 4, the shown example of the unit has an elongated construction and includes a flat, elongate bar 20 for carrying the tool 3. Hereinafter, the transmission and carrying unit 4 may also be referred to as tool carrier. The transmission and carrying unit 4 supports the front driving wheel 16b, and the V-belt 17 engaged thereat, at a certain, defined distance from the machine body 2. The bar 20 includes a first, rear end 21, which is provided to be removably mounted to the machine body 2. A second, front end 22 of the bar 20 is located away from the machine body 2. The tool 3 is rotatably mounted at the region of the front end 22.

At the rear end 21 of the bar 20, a fastening and stretching device 23 is provided. The bar 20 is adjustably connected to the machine body 2 via the fastening and stretching device 23, and the V-belt 17 is tensioned (e.g., stretched) via the fastening and stretching device. In the shown example, the construction of the fastening and stretching device 23 may be of known construction. For example, the fastening and stretching device 23 may include screw joints which may be tightened and eased via a number of screws and nuts, or the like, such as fastening member 24, for securing the bar 20 relative to the machine body 2. By the provision of adjustment opening(s) and fastening members, the bar 20 can be adjusted relative to the machine body 2 in the direction extending parallel to the elongation of the bar. For clarity, the adjustment direction is within a center plane 26 (FIG. 8) of the bar 20. In the illustrated example, a number of weight and material reducing openings 27 (See FIGS. 2 and 3) are provided in the bar 20.

Turning to specifics of the bar 20, the rear end 21 may have a blunt basic shape, and the bar may have a rectangular cross section towards the front end 22. More specifically, the rear end 21 is arranged at a square angle relative to longitudinal edges 29 of the bar 20. The rear end 21 is adjustably mounted adjacent to the rear driving wheel, and due to the above mentioned fastening and stretching device 23, the rear end 21 is movable in a direction from or towards the rear driving wheel. As such, the V-belt 17 can be dismounted when it is worn out and be replaced by a new one. Within the shown embodiment, the V-belt 17 is provided to run along and parallel with the edges 29 of the bar 20 in the center plane 26 of the bar 20, but at a distance from the edges 29 of the bar. It is contemplated that the bar 20 and the V-belt 17 could be configured/modified such that the V-belt runs in a groove provided in the bar edges 29.

The bar front end 22 has a rounded shape according to the illustrated example and comprises a hole 30 (FIG. 3) in the bar 20. The hole 30 is concentric and centrally located relative to the rounded shape. The hole 30 is adapted for a suitable bearing 31, e.g., a ball bearing or a sliding bearing. The bearing 31 fits within the hole 30 such that little or no play occurs between the bearing and the bar 20.

Returning attention to the several guards (e.g., tool guard 5), it is to be appreciated that typically the guards will be provided to at least partially cover and cooperate with the transmission and carrying unit 4. In the shown example, a fixedly mounted, double walled side guard 35 is provided for the transmission and carrying unit 4. A blade guard section 36 of the guard 5 is movably provided on the side guard 35 along the bar 20. Another section 37 of the guard 5 is connected to the blade guard section 36 via a hinge 40, and is thus pivotable relative to the blade guard section 36, the side guard 35, the transmission and carrying unit 4, and the tool 3. An edge guard 38 is provided for the V-belt 17. The edge guard 38 extends along an outer periphery of the V-belt 17 and around the front end 22 of the bar 20.

The side guard 35 is typically fixed relative to the bar 20. In one example, one end of the side guard 35 is welded to the bar 20 (e.g., at a generally flat surface 33 of the bar), and the other end of the side guard is fastened to the bar by a screw fastener. It is contemplated that the displacement of the tool guard 5 relative to the side guard 35 may be by any suitable mechanism and manner. Also, it is contemplated that the tool guard 5 may even be locked in place relative to the side guard 35. Locking elements 39 are schematically represented within the figures to indicate the ability to lock the guard 5 relative to the side guard 35.

Figure 5:
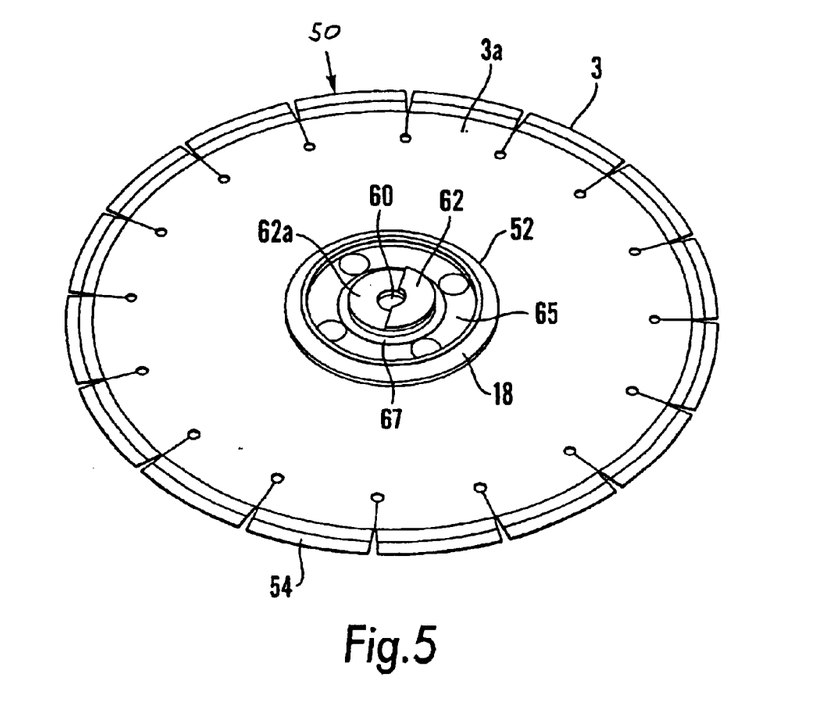
FIG. 5 shows a tool and a driving wheel half of a tool unit according to the present invention and usable for either of the first and second machine embodiments shown in FIGS. 1–4.
Figure 6:
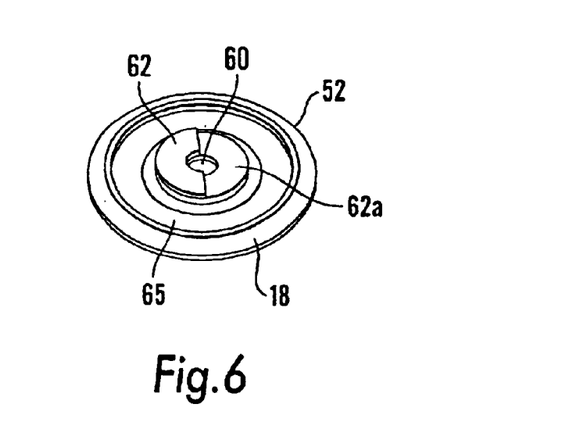
FIG. 6 shows the driving wheel half of FIG. 5.

It is to be appreciated that the front driving wheel 16*b* has a unique construction. Specifically, the front driving wheel 16*b* is comprised of two halves. One driving wheel half 52 is shown in FIGS. 5 and 6. In particular, FIG. 5 illustrates the driving wheel half 52 is associated with the tool 3. This associated set of structural elements provides a tool unit 50.

Figure 7:
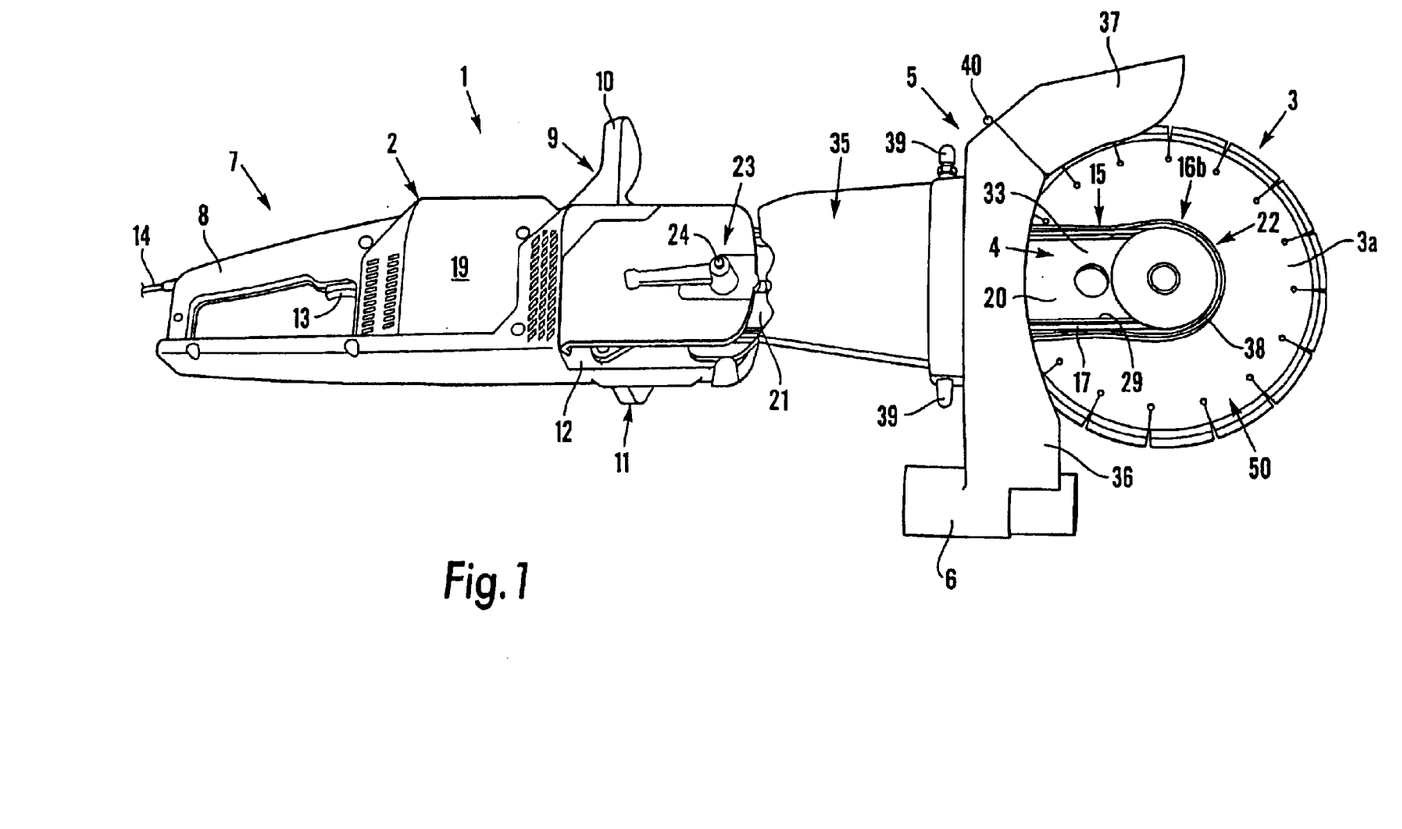
FIG. 7 is an enlarged fragmentary view of a front portion of the machine shown in FIG. 3.
Figure 8:
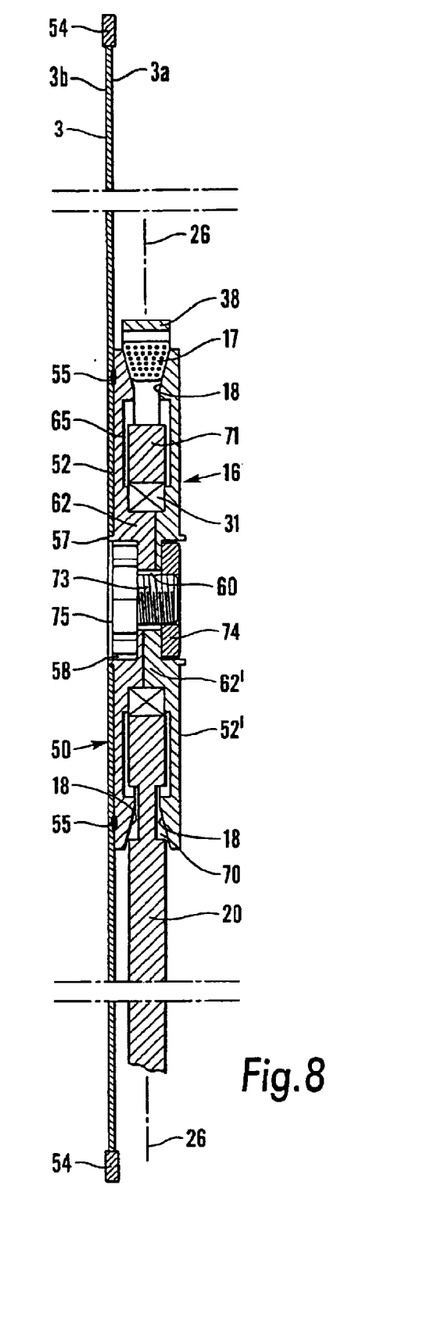
FIG. 8 is a view along the line VIII—VIII in FIG. 2.

With reference to FIGS. 5–8 and 10, details of the tool 3, the tool unit 50, and associated structures at the front end 22 are provided. As shown in FIGS. 5 and 8, the tool 3 consists of a flat disk with two sides 3*a*, 3*b*, a peripheral edge portion 54 of which is thicker, i.e. has a larger lateral extension than the rest of the tool, and constitutes the working part of the tool 3. The edge portion 54 may be equipped/tipped with diamonds, carborundum, or other grinding agents, or may be provided with teeth, etc. The tool 3 and the driving wheel half 52 may be united with one another through welding (e.g., spot welding or laser welding), soldering, gluing, riveting, or other fastening mechanism. In the shown example of FIG. 8, the tool 3 and the driving wheel half 52 of the tool unit 50 are united with one another by spot welding 55.

Figure 10:
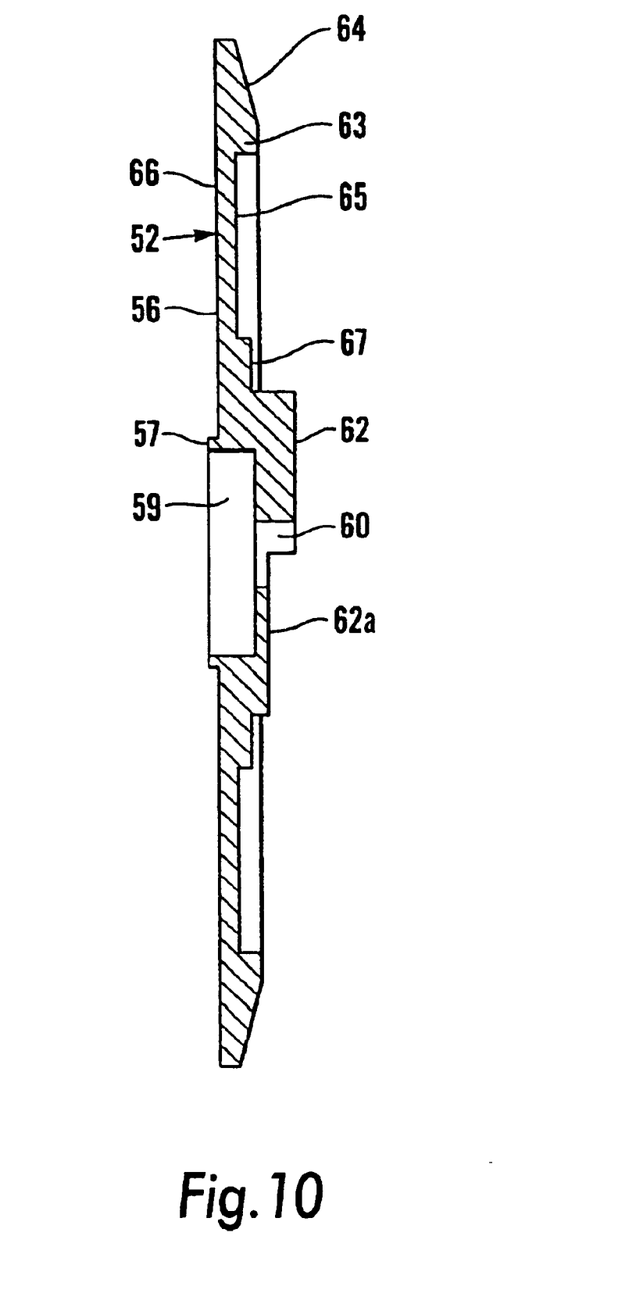
FIG. 10 is an axial cut view of the driving wheel half shown in either FIG. 8 or FIG. 9.

The driving wheel half 52 has a side 56 (FIG. 10) that is flat in order to be able to contact the tool 3 of the integrated tool unit 50. An annular projection 57 is designed such that it can extend into and fit in a central hole 58 (FIG. 8) of the tool 3. Radially inside of the annular projection 57 there is a circular recess 59 (FIG. 10). A central hole 60 extends through the driving wheel half 52.

On the side of the driving wheel half 52 that is distal from the tool 3, there is a central axle part 62 that provides an axle spindle. Also on the side distal from the tool, a radially outer peripheral part 63 of the driving wheel half 52 is provided with a bevelled surface 64. Radially between the peripheral part 63 and the axle part 62 is a major, annular recess 65, so that a reduced-thickness web 66 is located between the recess 65 and the flat side 56. Radially inside of the recess 65 there is an annular, thicker portion 67.

The front driving wheel 16*b* is formed of two discrete and, according to one embodiment, identically shaped driving wheel halves 52' (FIG. 8) that are provided such that the axle parts/axle spindles 62, 62' are turned towards one another to form an assembled wheel shaft. This, however, does not prevent the driving wheel halves/driving members from having different shapes, provided their functional basic principles are the same. In order to provide a coupling between the axle parts 62, 62', the axle part of each driving wheel half 52, 52', according to the embodiment, is cut-down a distance in that segment (i.e., 62*a*) of the axle parts 62, 62' which in the front driving wheel 16*b* are turned towards one another. One such cut-down portion has been designated 62*a* in FIG. 10 and is semicircular. It should be understood that also other coupling devices can be conceived, e.g. pins and holes in and on the axle parts/axle spindles 62, 62' that are turned towards one another.

As mentioned, the front driving wheel 16*b* is formed of two driving wheel halves 52, 52' that are substantially identical. Specifically, the two driving wheel halves 52, 52' may both be of the construction shown in FIG. 10. As shown in FIG. 8, the two driving wheel halves 52, 52' are brought together against one another in a mating position. In order to provide the mating between the driving wheel halves 52, 52', one of the driving wheel halves is turned 180° relative to the other one, so that the cut-down portion 62*a* at the central axle part 62 of one of the driving wheel halves abuts a non-cut portion of the central axle part 62 of the other driving wheel half. Between the thus brought together driving wheel halves 52, 52' there is formed a wedge-shaped groove 18 by the bevelled surfaces 64 (see FIG. 8). The V-belt 17 is located within the groove 18 and engages the bevelled surfaces 64 in order to transfer rotational force to the driving wheel halves 52, 52' and thus the tool 3. As such, the front driving wheel 16*b* provides a driving arrangement.

As shown in FIGS. 7 and 8, the region of the front end 22 of the bar 20 includes the centrally placed hole 30, in which the bearing 31 is located. An annular recess 70 is concentric with the hole 30 and dimensioned and located such that it can accommodate the peripheral part 63 (see FIGS. 8 and 10) of a driving wheel halves 52, 52'. It is to be appreciated that a respective recess 70 is located on each of the two planer sides of the bar 20. It is to be appreciated that one or both of the recesses 70 may be provided with an increased radial dimension to accommodate the peripheral parts 63 of smaller/larger radius driving wheel halves.

FIG. 7 also shows how the V-belt 17 extends along the bar 20 and around the front end 22 at a small distance from the bar 20 and is surrounded by the edge guard 38 at a small distance outside of the V-belt 17. The edge guard 38 consists of a rail (e.g., a steel rail) that has a breadth similar to the breath of the V-belt 17.

During the assembly, the tool unit 50 with the wheel half 52 is moved axially toward the hole 30 in the front end 22. The axle part 62 on the wheel half 52 is moved into the hole 30 until the annular, thicker portion 67 abuts the bearing 31. In a corresponding way, the other driving wheel half 52' is moved, on the opposite side of the bar, into the hole 30, turned 180° relative to the first inserted driving wheel half 52, so that the axle parts 62, 62' of the two driving wheel halves mate against each other and abut against the bearing 31. An annular part 71, which surrounds the bearing 31, and which is bounded by the annular recess 70, is accommodated in the annular recess 65 of the driving wheel halves 52, 52'.

The two driving wheel halves 52, 52' are fixed to one another by means of a screw 73 (FIG. 8), which extends through the holes 60 of the driving wheel halves, and a nut 74. A screw head 75 of the screw 73 and the nut 74 are accommodated in the recesses 59 in the driving wheel halves 52, 52'. Thus, the screw 73 and nut do not extend along the rotational axis beyond the driving wheel halves 52, 52', and the screw does not extend beyond the tool 3.

By longitudinal displacement of the bar 20 forward from the machine body 2 via the fastening and stretching device 23, the V-belt 17 is caused to adopt a proper position in the wedge-shaped groove 18. Specifically, a suitable contact pressure against the two bevelled surfaces 64, which between them form the wedge-shaped groove 18, is achieved.

It is to be noted that in accordance with the present invention, the tool 3 provides the maximum axial (i.e., rotational axis) extent of the tool unit 50. As shown in FIG. 8, the maximum axial extent is at the left side 3b of the shown structure. In fact, the tool 3 provides the maximum axial extent of all of the structure shown in FIG. 8. In the specific example shown, the peripheral edge portion 54 provided the maximum axial extent, and, as the tool 3 is rotated, the left-most side of the peripheral edge portion 54 sweeps in a plane transverse to the rotational axis that is at the maximum axial extent. As such, it is to be appreciated that there is no impediment, at least on the left side as shown in FIG. 8, to the tool 3 being operated to cut at a location into material that is deeper than the radius of the tool.

The transverse extent of the side guard 35 (FIG. 2) is less than the furthest axial extent of the tool 3. Thus, the side guard 35, when the blade guard section 36 has been withdrawn along the side guard, can follow the tool 3 into a deep groove within which the tool is being used to cut right at a side of the groove.

Figure 4:
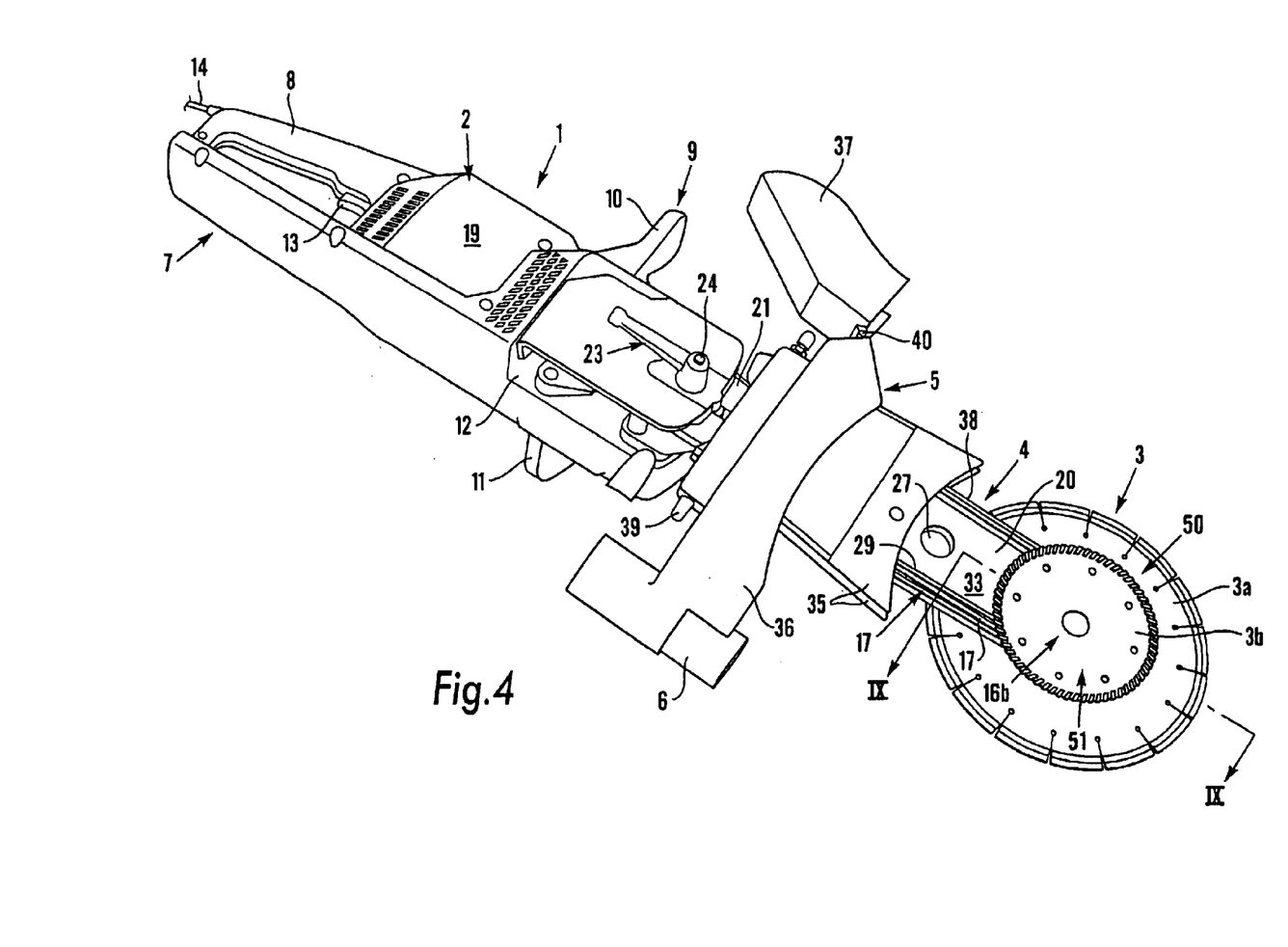
FIG. 4 is a schematic perspective view of a machine according to a second machine embodiment of the present invention.
Figure 9:
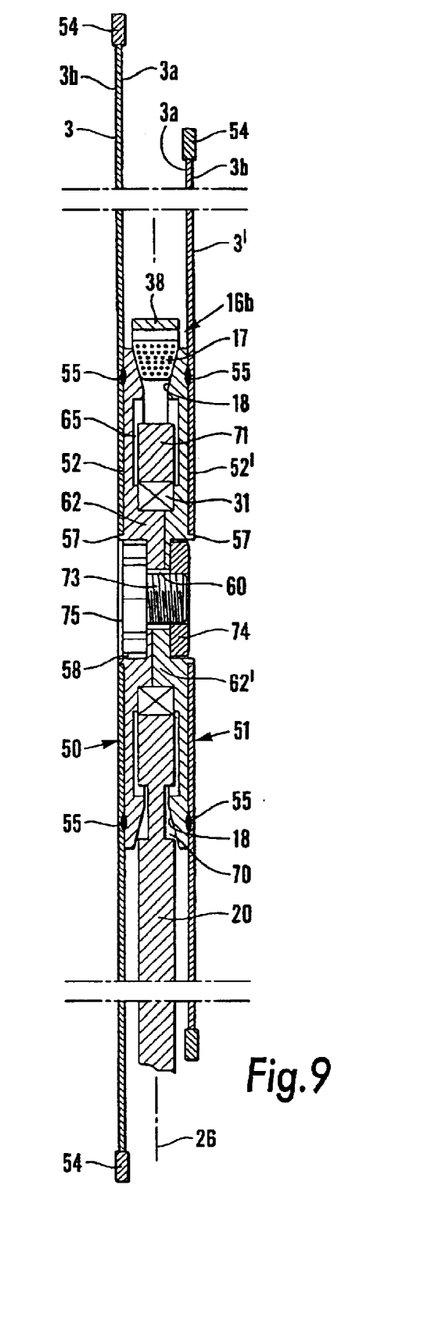
FIG. 9 is a view along the line IX—IX in FIG. 4.

The embodiment of the machine shown in FIG. 4 and the specifics shown in FIG. 9 differ from embodiment and specifics of the first machine embodiment and the specifics shown in FIG. 8. Specifically, two tools 3, 3' are provided, and each of the two driving wheel halves 52, 52' are respectively part of two tool units 50 and 51. As such, FIG. 9 shows one example of a tool arrangement. The second tool 3', identified in FIG. 9, has a smaller diameter than the first tool 3 that is included in the first tool unit 50. In other respects, the design is the same as has been described with reference to FIG. 8, as well as the mode of assembly.

It is to be noted that in accordance with the present invention, the tool 3 provides the maximum axial (i.e., rotational axis) extent of the tool unit 50, and the tool 3' provides the maximum axial extent of the tool unit 51. As shown in FIG. 9, the maximum axial extent of the tool unit 50 is at the left side and the maximum axial extent of the tool unit 51 is at the right side. In fact, the tools 3, and 3' provide the axially furthest boundaries of all of the structure shown in FIG. 8. In the specific example shown, the peripheral edge portions 54 provide the maximum axial extents. When each respective tool 3, 3' is rotated, the peripheral edge portion 54 sweeps in a plane transverse to the rotational axis that is at the associated maximum axial extent. As such, it is to be appreciated that there is no impediment, at least on the outer left side and outer right side, as shown in FIG. 9, to the tool 3 being operated to cut at a location into material that is deeper than the radii of the tools 3, 3'.

The thickness of the side guard 35, i.e. the transversal distance between the outer surfaces of the side guard, is smaller than the distance between the outer sides of the tools 3, 3', i.e. the second sides, which means that the side guard 35 can be entered into a groove, which, according to the method of using the machine of the invention is established in the object that is being worked, when the material between the kerfs (cuts) which have been made by the tools, has been removed, and when the groove having flat and parallel side walls has reached such a depth that also the side guard 35 can be entered in the groove, when the blade guard section 36 has been withdrawn along the side guard 35.

On example method of working with the machine 1 and with the tool unit/tool units 50, 51, in accordance with the present invention, is further explained. For this example explanation, it is assumed that the machine 1 is equipped with two tool units 50, 51, as shown in FIG. 4 and FIG. 9. Before starting the work, the tool guard 5 is moved forwards to a position similar to the position shown in FIG. 1. The motor in the machine body 2 is started. The operator controls the machine 1 so that the motor is caused to drive the V-belt 17. Due to the engagement between the V-belt 17 and the wedge-shaped groove 18, the front driving wheel 16b is rotated. As such, the tools 3 and 3' are caused to rotate.

Figure 11A:
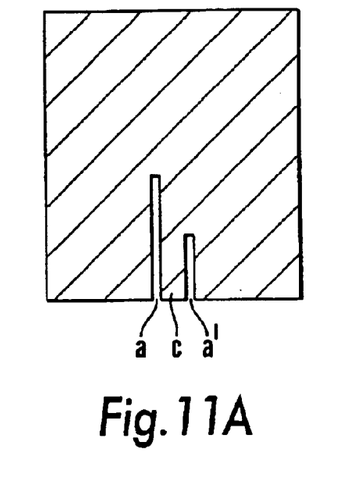
FIGS. 11A–11D show sequential views of a section of material of an object that is being worked in accordance with a method of the present the invention.

By pressing against the material of the object to be cut (see FIG. 11A), there is first established a first saw kerf in the object by means of the larger tool 3. When the tool 3 has penetrated the object to a depth corresponding to the radial difference between the two tools 3 and 3', also the smaller tool 3' begins penetrating the object to form a second kerf in the object, parallel with the kerf that is formed by the larger tool 3. The working can proceed in this way until the tools 3 and 3' have penetrated so deeply that the edge guard 38 touches the object. The initial kerfs, which thus are established in the object by means of the tools 3 and 3', are designated a and a', respectively, in FIG. 11A. The work proceeds until the kerfs a and a' in the object also have achieved a desired extent along the object. Specifically, during this phase, the machine 1 may be moved along the surface of the object with the edge guard 38 sliding against the object.

At least if the conditions are favourable, e.g. that the material of the object that is worked is not too tough, and/or if the distance between the established kerfs in the object are sufficiently short, the material c between the kerfs a and a' loosens successively as the kerfs are formed because of vibrations from the tools and/or because of friction between the tools and the material between the kerfs. The work therefore can proceed continuously by moving the machine 1 along the surface of the object with the edge guard 38 sliding against the bottom of the wider groove that is being formed in the object. During this phase, the bar 20 and even the side guard 35, if the tool guard 5 is moved rearward, may eventually enter the groove being created due the lack of obstruction at the axial extends of the two tools 3 and 3'.

Figure 11B:
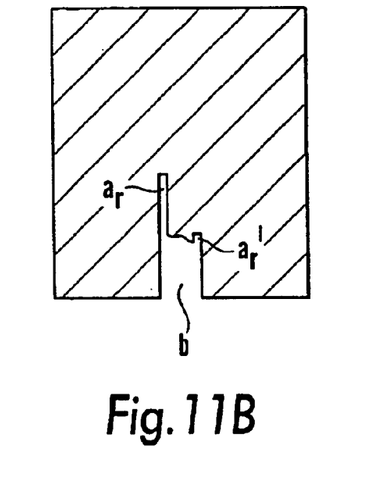

If the material c between the first kerfs a and a' does not loosen in connection with the establishment of the kerfs in the object, a methodology is employed to still allow deep cutting penetration into the material of the object. Specifically, after the initial kerfs are established, preferably when they also have achieved a desired length, the machine 1, and the tools 3, 3' thereof, is withdrawn from the object. Next, according to this mode of operating the machine according to the invention, the material c between the two first established kerfs a and a' in the object is removed. The technique, which is employed for removing this material, may depend on the kind of material of the object. As some examples the removal technique may include breaking, hammering, wedging, axing, knocking, vibrating, blowing, spraying, milling, drawing, prizing, or any combination of such techniques. Thus, there is established a wide groove b (FIG. 11B) in the object, which allows the tool units 50, 51 including the bar 20, the front driving wheel 16b and the V-belt 17, the edge guard 38 and the side guard 35 to penetrate deeper into the object.

Figure 11C:
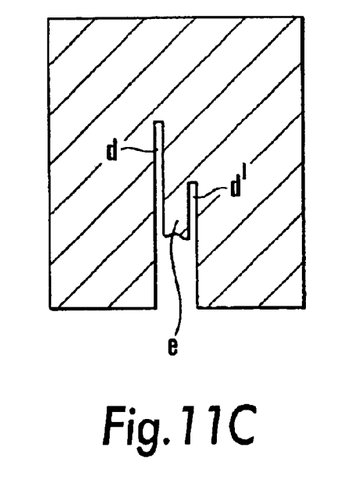
Figure 11D:
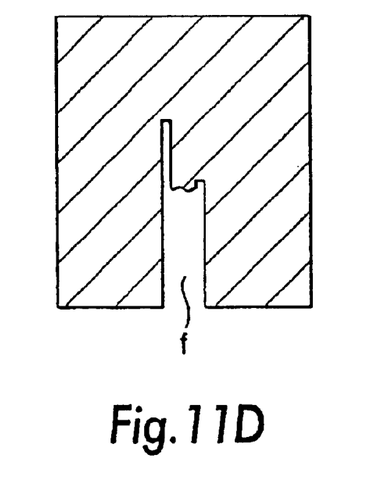

In the object, there remains a kerf portion $a_r$ of the kerf a, which was formed by the larger tool 3, and possibly a kerf portion $a_r'$ of the kerf a' which was formed by the smaller tool 3'. These kerf portions a, $a_r'$ may be used as guiding trails during the next step of operation, when the operator drives the tools 3, 3' deeper into the object to make a next set of kerfs d and d', respectively, as shown in FIG. 11C. The material between the new kerfs d and d' is designated e within FIG. 11C. The material e can be removed in the same way as has been described in the foregoing, so that a deeper groove f (FIG. 11D) is provided. The work may proceed in this way by alternately establishing deeper and deeper parallel kerfs and removal of the material between the kerfs until the desired or maximal possible working depth has been achieved. The tool guard 5 may ultimately restrict increases in the working depth. It is understood that it is possible to work stepwise in this way into the object and that after each working operation by means of the tool units 50, 51, the material between the kerfs is removed, except after the last working operation, when the desired depth has been achieved by means of the larger tool 3.

Figures 12, 13:
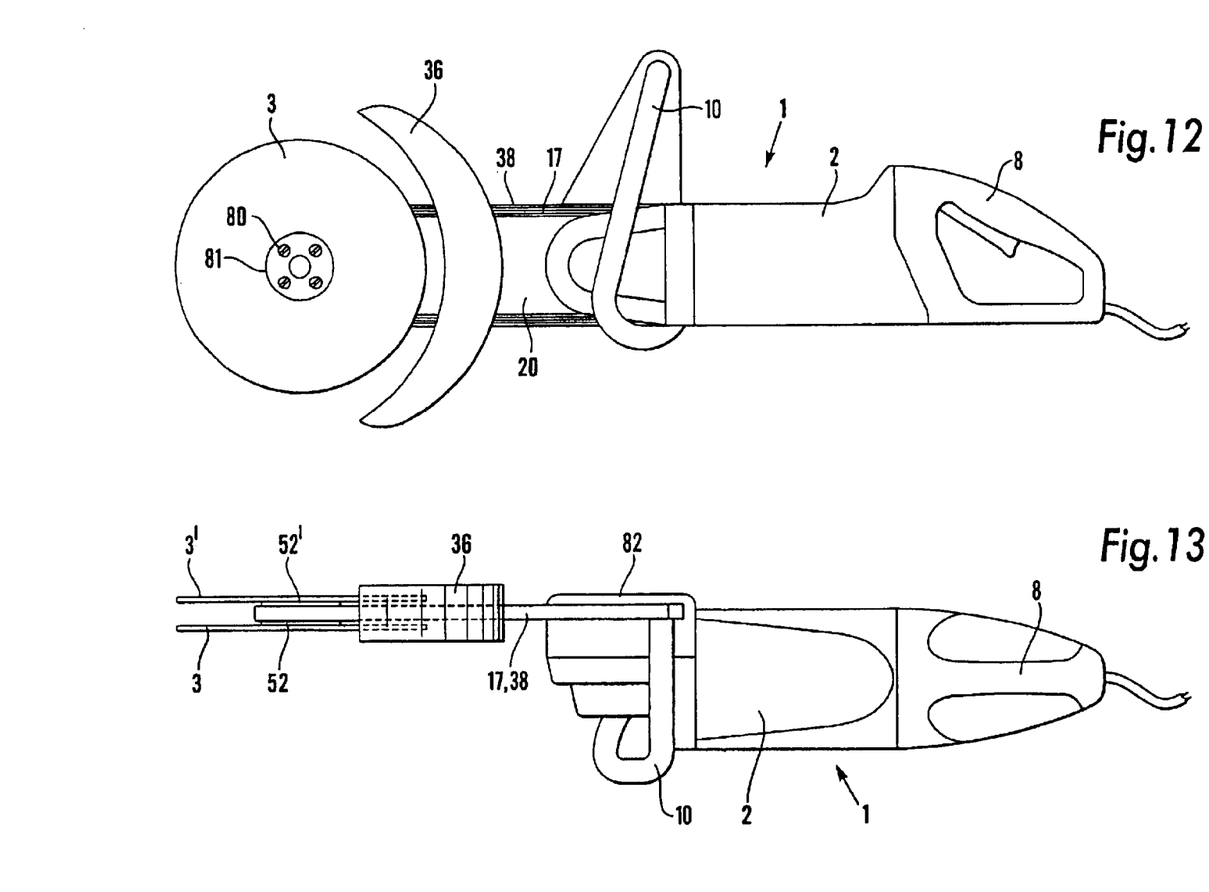
FIG. 12 schematically shows a side view of a third machine embodiment in accordance with the invention.
FIG. 13 is a top view of the embodiment of FIG. 12.

FIGS. 12 and 13 show an example of how a machine body 2 of known design, containing an electric driving motor, can be equipped according to the principles of the invention. Thus, in the front part of the machine 1 there is an elongated bar or tool carrier 20 in the form of a flat bar, carrying two diamond-tipped blade tools 3, 3' of the flat sawing type, each having a driving wheel half 52, 52' secured to the inner side of the saw blades. The tools 3, 3' in this example have equal radii, and are part of yet another example of a tool arrangement.

The tools 3, 3' are united with one another through recessed screws 80, which extend through a washer 81, which is recessed in one of the tools 3, 3'. The screws 80 are secured by screwing in that driving wheel half 52' which is connected to the opposite tool 3'.

A front blade guard section 36 is shown only schematically. It is displaceable along the bar 20, which is located adjacent to one side of the machine 1. Suitably the blade guard section 36 and a rear driving belt guard 82 can be demounted in order also to make it possible to use the machine 1 for sawing close to walls, roofs, etc. in corners.

Accordingly it is to be appreciated that the tool, tool unit, machine, and method of the present invention address the issue of cutting or penetrating thicker objects than what has been previously possible by means of disk shaped, rotatable tools having a certain diameter. According to a one aspect of the present invention, a side of the tool defines a plane which forms a limit of the, in the axial direction, maximally projecting part of the tool assembly. As another aspect, the entire machine body is provided at a distance from the tool assembly with reference to the radial direction of the tool assembly, and that the tool carrier, which is elongated, extends from the machine body over the distance beyond the center of rotation . . . According to one aspect of the method of the invention, two substantially parallel kerfs are established to a certain depth in the object to be worked, that at least part of the material between the kerfs is removed, so that a wider groove is established in the object, and that at least one of the kerfs then is made deeper in the extension of the kerfs.

Typically, the width of the tool carrier is substantially larger than its thickness, wherein the width is the extension of the tool carrier in a plane that is parallel with the plane of the tool/the tools and perpendicular to the longitudinal direction of the tool carrier. Preferably, the tool carrier consists of an elongated bar of a shape that is conventional for guide bars in conventional chain saw machines, but also other designs, preferably flat bars, having a sufficient bending resistance in the radial direction of the tool/tools are conceivable. In principle, the tool carrier, which basically determines the maximal penetration depth of the tools into the object to be worked, may have a length that is limited only by practical circumstances in the same way as applies for a chain saw machine, i.e. circumstances such as the weight of the machine, which of course increases the longer the tool carrier is, which in turn makes the manoeuvrability of the machine more difficult.

In another aspect, a driving member is provided by the driving wheel having at least one circumferential driving surface. The driving wheel may include a first part and a second part, each of the parts having a circumferential driving surface. The driving surfaces are provided on each side of a plane, which is perpendicular to the axle of rotation of the driving wheel and located between the parts. Suitably, the two driving surfaces of the driving wheel, one on each one of the parts, are identically designed. Also the denomination "driving wheel half" is used in this context as a denomination of the driving members, when two such driving members in combination form a driving wheel. According to one aspect, the driving surface or driving surfaces form at least one power transmission groove for a power transmission device. More particularly, according to one aspect, the two driving surfaces consist of bevelled surfaces on the parts, the bevelled surfaces between them forming a V-belt groove for a power transmission device in the form of the V-belt.

According to one aspect, the parts of the driving wheel, each of which comprising a circumferential driving surface, are provided on each side of the tool carrier. Further, according to another aspect, a bearing is provided in the front end of the tool carrier. According to yet another aspect, the driving wheel has an axle, which extends through the tool carrier between the two driving wheel parts, and is journalled in the bearing in the tool carrier. Suitably, each of the two driving wheel parts has an axle spindle, the axle spindles extending towards one another and forming in combination the axle. This makes it possible, according to an aspect of the invention, to make the two driving wheel parts, including the axle spindles belonging to them, identical.

According to an aspect of a machine according to the invention, a tool assembly has at least two parallel, coaxial tools, comprising two outer tools, that each of the outer tools has a first side which is an inner side, a second side which is an outer side, and a peripheral edge portion which is the working part of the tool, and that that side of the peripheral edge portion of the outer tools which is part of the outer side of respective tool defines a plane, which forms a limit of the, in the radial direction, maximally projecting parts of the tool assembly in the region of the outer sides. It is to be appreciated that the number of rotatable, coaxial tools included in the tool assembly may be more than two.

It is to be appreciated that numeric dimensions are not intended to limit the scope of the present invention. However, the following numeric information provides some examples. The smallest tool diameter is normally at least 60 mm, typically at least 80 mm, regardless as to whether the diameters of the two tools are equal or different. In the case the tools having different diameters, the diameter of the smallest tool normally has a maximum of 400 mm, preferably 250 mm, and suitably 150 mm. The larger tool may have a diameter that is at least 40 mm, preferably at least 60 mm, but not more than 100 mm larger diameter than the smallest tool. In the case when the tools have equal diameters, when the number of tools is two, the diameter should be at least 80 mm, but should normally not exceed 500 mm. Preferably, the diameter is 60 to 300 mm, suitably 80 to 250 mm. A very important advantage with small diameters over large diameters is that tools having a small diameter do not require as large engine power as tools having larger diameters. The reason why conventional cutting and saw machines nevertheless are provided with tools having large, and in some cases very large, diameters, is that large diameters are required in conventional machines for the achievement of a desired penetration depth, a condition which is eliminated by the invention.

With reference to the above-discussed example tool diameters, the distance between the tools, typically, is at least 5 mm, with a maximum of 100 mm. Even when the tool diameters lie within the upper part of the above mentioned dimension ranges, it is advantageous if the distance between the tools is small, and therefore the distance should be at a maximum of 50 mm, and suitably at 20 mm. A very important advantage with a short distance between the tools is that this essentially facilitates the removal of the material between the kerfs (cuts). If the distance between the kerfs is for instance not larger than the order of 10 or 15 mm, the material may, even if the material consists of, e.g., concrete or brick, even loosen successively as the kerfs are established, because of vibrations and friction between the tools and the material between the kerfs. Possibly, it may be necessary that the operator wobbles or sways the machine slightly in the lateral directions during the working operation. In other words, the need of a subsequent clearing operation for removing the material between the kerfs may be completely eliminated, or at least may such clearing operation be essentially facilitated.

In one aspect of the present invention, the tool or each tool, respectively, is included in a tool unit comprising at least one disk shaped tool having a first side, a second side, a peripheral edge portion that is the working part of the tool, and at least one driving member that is coaxial with the tool. Another aspect is that the driving member is connected or connectable to the first side of the tool, and that that side of the peripheral edge portion which is part of the second side of tool defines a plane, which forms a limit of the, in the axial direction, maximally projecting part of the tool unit. Also, as an aspect, the driving member typically has at least one circumferential driving surface provided to be able to cooperate with a power transmission.

According to an aspect of the present invention, at least the main part of the second side of the tool is essentially flat inside of the peripheral edge portion, which is the working part of the tool. The tool and the driving member of the tool unit may be made as two separate components, which subsequently have been permanently united to form an integrated unit. As an alternative, the tool and the driving member are made of a blank, which has been worked to adopt the final shape of tool unit. In the latter case, the driving member may be formed of a central portion of the tool blank, which has been pressed out in the axial direction of the tool unit and thereafter has been worked to achieve the final shape of the driving member.

According to still another aspect of the present invention, the driving member and the tool consist of two separate components, which can be connected by means of follower and coupling members to form a tool unit. If, for example, the tool consists of a thin saw blade and if the central portion of the saw blade is pressed out to form a recess on that side which is opposite the side where the driving member is provided, a coupling member, e.g. a screw head or a nut, may be provided in that recess and pins or other followers may be provided on the driving member, the pins or other followers matching apertures in the pressed out central portion of the tool. In the case the tool instead consists of a cutter disk, a head of a screw which functions as a coupling member may be recessed in the cutter disk on the outer side thereof. Also in that case, followers in the form of pins and holes may be provided between the tool and the driving member/the driving wheel half for the purpose of providing a dismountable tool unit having a replaceable tool.

It is to be appreciated that various types of power transmission devices may be employed according to the invention, e.g. endless V-belts, toothed belts as mentioned above, etc., but in principle also an endless roller chain can be conceived, particularly a comparatively broad roller chain, cooperating with driving members in the form of sprockets, each of which is connected or connectable to a tool on one or both sides of the tool carrier.

From the above description of the invention, those skilled in the art will perceive improvements, changes and modifications. Such improvements, changes and modifications within the skill the of the art are intended to be covered by the appended claims.

Having described the invention, the following is claimed:

1. A tool arrangement for a cutting machine, the tool arrangement including:
    a first disk-shaped tool rotatable about an axis and having an axially outer side defining a first maximum tool arrangement boundary along the axis, the first tool having a radially outer peripheral cutting edge portion;
    a second disk-shaped tool rotatable about the axis and having an axially outer side defining a second maximum tool arrangement boundary along the axis, the second tool having a radially outer peripheral cutting edge portion; and
    a driving arrangement, at an axial location between the first and second tools, for supporting the first and second tools for rotation and transferring driving force from a transmission member to rotate the first and second tools, a radially outer periphery of the driving arrangement being at a radius less than a radius of the peripheral cutting edge portion of the first tool and less than a radius of the peripheral cutting edge portion of the second tool to permit the first and second tools to engage a material to be cut without engagement of the driving arrangement with the material to be cut, a portion of the driving arrangement including a driving wheel wherein the transmission member is movable within a plane perpendicular to the axis and said driving wheel is within said plane and the driving arrangement includes a bearing that is located within the plane.

2. A tool arrangement as set forth in claim 1, wherein a furthest axial extent of the peripheral cutting edge portion of the first tool is at the first maximum tool arrangement boundary along the axis.

3. A tool arrangement as set forth in claim 1, wherein an axial distance between the outer sides of the first and second tools is greater than an axial width of the first tool and is greater than an axial width of the second tool such that during a cutting operation on the material to be cut, a segment of the material between the first and second tools is left uncut.

4. A tool arrangement as set forth in claim 1, wherein the radial distance of the peripheral cutting edge portion of at least one of the first and second tools is greater than an axial distance between the outer sides of the first and second tools.

5. A tool arrangement as set forth in claim 1, wherein the driving wheel has a power transmission groove.

6. A tool arrangement as set forth in claim 5, wherein said driving wheel comprises two discrete halves, and each discrete half of the driving wheel provides a circumferential surface of the power transmission groove for engagement with the transmission member.

7. A tool arrangement as set forth in claim 6, wherein the power transmission groove is configured to receive a V-belt as the transmission member.

8. A tool arrangement as set forth in claim 1, wherein said driving wheel comprises two discrete halves, and each half includes a portion of a spindle as an axially overlapping portion, and the spindle portions mate to provide an axial spindle.

9. A tool arrangement as set forth in claim 8, wherein each spindle portion extends axially away from a respective one of the first and second tools and toward the other of the first and second tools.

10. A tool arrangement as set forth in claim 1, wherein an axial distance between the outer sides of the first and second tools is greater than an axial width of the first tool and is greater than an axial width of the second tool such that during a cutting operation on the material to be cut, a segment of the material between the first and second tools is left uncut and at least partially removable by another means, and wherein the radial distance of the peripheral cutting edge portion of at least one of the first and second tools is sized such that the tool may extend into the material to be cut greater than the radial distance of the peripheral cutting edge portion of at least one of the first and second tools subsequent to removal of the at least part of the uncut segment.

11. A cutting machine for cutting through a material, the machine including:
a machine body containing a power source;
a tool carrier extending from the machine body and the contained power source;
a power transmission arrangement extending from the machine body and the contained power source along the tool carrier; and
a tool arrangement supported on the tool carrier, the tool arrangement including:
a first disk-shaped tool rotatable about an axis and having an axially outer side defining a first maximum tool arrangement boundary along the axis, the first tool having a radially outer peripheral cutting edge portion;
a second disk-shaped tool rotatable about the axis and having an axially outer side defining a second maximum tool arrangement boundary along the axis, the second tool having a radially outer peripheral cutting edge portion; and
a driving arrangement, at an axial location between the first and second tools, for supporting the first and second tools for rotation and transferring driving force from the power transmission arrangement to rotate the first and second tools, a radially outer periphery of the driving arrangement being at a radius less than a radius of the peripheral cutting edge portion of the first tool and less than a radius of the peripheral cutting edge portion of the second tool to permit the first and second tools to engage a material to be cut without engagement of the driving arrangement with the material to be cut, a portion of the driving arrangement including a driving wheel wherein the power transmission includes a transmission member movable within a plane perpendicular to the axis and said driving wheel is within said plane and the driving arrangement includes a bearing that is located within the plane.

12. A cutting machine as set forth in claim 11, wherein an axial distance between the outer sides of the first and second tools is greater than an axial width of the first tool and is greater than an axial width of the second tool such that during a cutting operation on the material to be cut, a segment of the material between the first and second tools is left uncut.

13. A cutting machine as set forth in claim 11, wherein the radial distance of the peripheral cutting edge portion of at least one of the first and second tools is greater than an axial distance between the outer sides of the first and second tools.

14. A cutting machine as set forth in claim 11, wherein an axial distance between the outer sides of the first and second tools is greater than an axial width of the first tool and is greater than an axial width of the second tool such that during a cutting operation on the material to be cut, a segment of the material between the first and second tools is left uncut and at least partially removable by another means, and wherein the radial distance of the peripheral cutting edge portion of at least one of the first and second tools is sized such that the tool may extend into the material to be cut greater than the radial distance of the peripheral cutting edge portion of at least one of the first and second tools subsequent to removal of the at least part of the uncut segment.

15. A cutting machine as set forth in claim 11, wherein the radial distance of the peripheral cutting edge portion of the first tool is equal to the radial distance of the peripheral cutting edge portion of the second tool.

16. A cutting machine as set forth in claim 11, wherein an axial distance between the first and second tools is less than the radial distance of the peripheral cutting edge portion of each of the first and second tools.

17. A cutting machine as set forth in claim 11, wherein an axial distance between the first and second tools is less than the radial distance of the peripheral cutting edge portion of one of the first and second tools.

18. A cutting machine as set forth in claim 11, wherein the tool carrier has a bearing for engagement with the driving arrangement.

19. A cutting machine as set forth in claim 11, wherein an axial width of the tool carrier and an axial width of the power transmission arrangement are less than an axial distance between the first and second tools.

20. A cutting machine as set forth in claim 11, wherein the power transmission arrangement includes an endless member.

21. A cutting machine as set forth in claim 11, wherein said driving wheel comprises two discrete halves, and each discrete half of the driving wheel includes a portion of a spindle as an axially overlapping portion, and the spindle portions mate to provide an axial spindle.

22. A cutting machine as set forth in claim 21, wherein each spindle portion axially extends away from a respective one of the first and second tools and toward the other of the first and second tools.

23. A cutting machine as set forth in claim 11, wherein a furthest axial extent of the peripheral cutting edge portion of the first tool is at the first maximum tool boundary along the axis.

24. A cutting machine as set forth in claim 11, wherein the driving wheel has a power transmission groove.

25. A cutting machine as set forth in claim 24, wherein said driving wheel comprises two discrete halves, and each discrete half of the driving wheel provides a circumferential surface of the power transmission groove for engagement with the transmission member of the power transmission arrangement.

26. A cutting machine as set forth in claim 25, wherein the power transmission groove is configured to receive a V-belt as the transmission member.

\* \* \* \* \*

UNITED STATES PATENT AND TRADEMARK OFFICE
CERTIFICATE OF CORRECTION

PATENT NO. : 6,874,400 B2
DATED : April 5, 2005
INVENTOR(S) : Johansson

It is certified that error appears in the above-identified patent and that said Letters Patent is hereby corrected as shown below:

<u>Title page,</u>
Please add -- [30]  Foreign Application Priority Data
         Apr. 23, 2001   (SE)……………………...010439.8 --.

<u>Column 7,</u>
Line 64, after "wheel halves" please insert -- 52, --.

Signed and Sealed this

Twenty-eighth Day of June, 2005

JON W. DUDAS
*Director of the United States Patent and Trademark Office*